(12) United States Patent
Kern et al.

(10) Patent No.: US 11,952,056 B2
(45) Date of Patent: Apr. 9, 2024

(54) ELECTRIC POWERED RECIRCULATING BALL ASSEMBLY

(71) Applicant: Steering Solutions IP Holding Corporation, Saginaw, MI (US)

(72) Inventors: Paul E. Kern, Reese, MI (US); Jason A. Dutsky, Bay City, MI (US); Jeffrey E. Beyerlein, Birch Run, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 466 days.

(21) Appl. No.: 17/219,158

(22) Filed: Mar. 31, 2021

(65) Prior Publication Data

US 2021/0309286 A1 Oct. 7, 2021

Related U.S. Application Data

(60) Provisional application No. 63/004,073, filed on Apr. 2, 2020.

(51) Int. Cl.
*B62D 5/04* (2006.01)

(52) U.S. Cl.
CPC ......... *B62D 5/0448* (2013.01); *B62D 5/0421* (2013.01)

(58) Field of Classification Search
CPC .. B62D 5/0448; B62D 5/0421; B62D 5/0442; B62D 3/08; B62D 5/0445; B62D 3/126
See application file for complete search history.

(56) References Cited

U.S. PATENT DOCUMENTS

| | | | | |
|---|---|---|---|---|
| 4,742,882 | A * | 5/1988 | Shimizu | B62D 5/0448 180/444 |
| 4,828,062 | A * | 5/1989 | Shimizu | B62D 5/0427 180/413 |
| 6,705,423 | B2 * | 3/2004 | Ozsoylu | B62D 5/0427 180/444 |
| 7,207,235 | B2 * | 4/2007 | Yamamoto | F16C 33/3706 74/424.82 |
| 8,360,197 | B2 | 1/2013 | Escobedo et al. | |
| 8,567,554 | B2 | 10/2013 | Zaloga et al. | |
| 2003/0192735 | A1 * | 10/2003 | Yamamoto | B62D 5/0448 180/444 |
| 2005/0061575 | A1 * | 3/2005 | Abe | B62D 5/0448 180/444 |
| 2005/0098376 | A1 * | 5/2005 | Ozsoylu | B62D 5/0424 180/444 |
| 2021/0261188 | A1 * | 8/2021 | Ko | B62D 3/08 |

\* cited by examiner

*Primary Examiner* — Anne Marie M Boehler
(74) *Attorney, Agent, or Firm* — Dickinson Wright PLLC

(57) ABSTRACT

An electric powered recirculating ball assembly includes a steering rack. The electric powered recirculating ball assembly also includes a steering gear housing. The electric powered recirculating ball assembly further includes a plurality of rolling elements operatively coupled to the steering rack and in contact with mating geometry of a component operatively coupled to, or integrally formed with, the steering gear housing.

14 Claims, 6 Drawing Sheets

ELECTRIC POWERED RECIRCULATING BALL ASSEMBLY

CROSS REFERENCE TO RELATED APPLICATION

This application claims the benefit of priority to U.S. Provisional Patent Application Ser. No. 63/004,073, filed Apr. 2, 2020, the disclosure of which is incorporated by reference herein in its entirety.

FIELD OF THE INVENTION

The present disclosure relates to recirculating ball assemblies for steering systems and, more particularly, to an electric powered recirculating ball assembly with bearing supports and a decoupled ball circuit.

BACKGROUND

In light truck and commercial vehicle applications using hydraulic recirculating ball steering gears, the conversion to electric power is desired. This involves a mechanical system that will use power from an electric motor and amplify the torque to interface with steering linkage designs in current use.

As shown in FIG. 1, in a typical recirculating ball steering system 10, large force reactions are generated in a direction perpendicular to the axis A of the output shaft. This is due to the force couple generated by the assist force 12 at the rack 14 and the resistant load 16 at the sector gear 18. Since these equal and opposite forces are not aligned, the reaction moment M is generated. This reaction moment M in turn generates a significant radial force 20 on the rack 14.

As shown in FIG. 2, in addition to the load reaction from the force couple, there is a load reaction 23 generated by the action of the gear teeth 24. Since the gear teeth 24 have angular contact, a force component (or separating force) 26 is generated which is proportional to the system output torque.

As shown in FIG. 3, for a recirculating ball steering gear system 30 with electric power, the linear assist force that is applied to the gear teeth is to be generated with a ball screw assembly. For any steering system using a ball screw assembly as a part of the assist mechanism, an assist torque T of sufficient magnitude will be needed. This assist torque T applied to the ball screw assembly will produce a large resultant reaction force 32 in the gear teeth 34 of the mating gear set 36 and an equal radial force reaction 38 in the ball screw.

Given the large magnitude of the reaction forces present in prior electric systems, a mechanism to reduce those forces is needed to reduce the size of the ball circuit and improve its function.

SUMMARY OF THE DISCLOSURE

According to one aspect of the disclosure, an electric powered recirculating ball assembly includes a steering rack. The electric powered recirculating ball assembly also includes a steering gear housing. The electric powered recirculating ball assembly further includes a plurality of rolling elements operatively coupled to the steering rack and in contact with mating geometry of a component operatively coupled to, or integrally formed with, the steering gear housing.

According to another aspect of the disclosure, an electric powered recirculating ball assembly includes a steering rack. The electric powered recirculating ball assembly also includes a plurality of rolling elements operatively coupled to the steering rack. The electric powered recirculating ball assembly further includes a ball nut located adjacent the steering rack, wherein the ball nut is moveable relative to the steering rack.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The discussion herein is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or any other suitable vehicle, includes one of various steering system schemes. For example, steer-by-wire (SbW) and driver interface steering may be employed. Often, these various steering schemes include an electric power steering (EPS) system including components such as a steering wheel, a column, a rack-pinion gear, and/or an electric motor actuator, etc. The EPS system helps the operator steer a vehicle by providing desirable assist torque. The assist torque is based on an operator's applied torque. In a steady-state sense, the operator torque and assist torque counter the rack force generated because of tire-road interaction.

Although existing solutions have provided a certain amount of workability, improvements in power steering system design and adaptability continue to be of interest. Accordingly, systems and methods, such as those described herein, configured to provide improved packaging and operational framework of a power steering system, may be desirable. In some embodiments, the systems and methods described herein may be configured to provide improvements to the operational framework of the power steering system and to improve the manufacturing and assembly processes associated with the overall system.

Referring now to the Figures, where the invention will be described with reference to specific embodiments, without limiting same, disclosed are embodiments that reduce the stress present in the ball circuit of a ball screw assembly and gear teeth.

Figure 2:
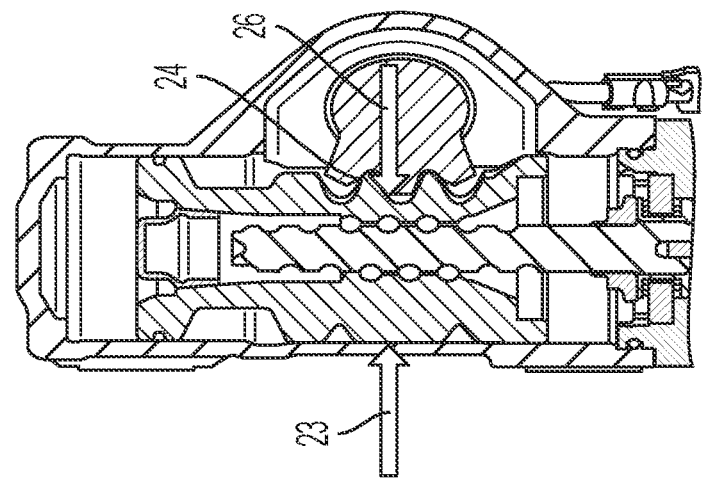
FIG. 2 is another sectional view of the recirculating ball steering system according to the prior art example illustrating additional forces associated with operation thereof.
Figure 1:
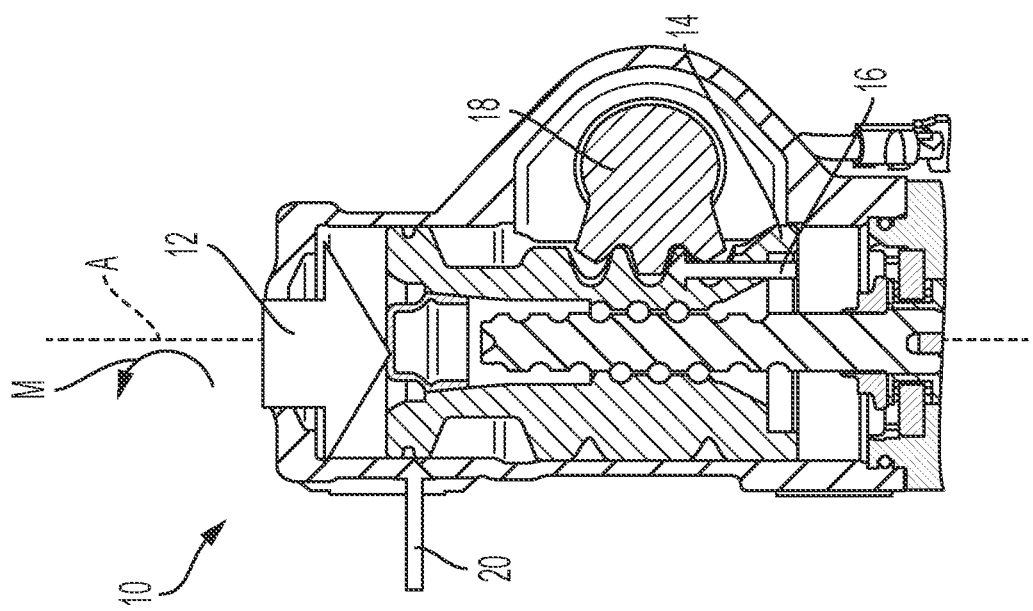
FIG. 1 is a sectional view of a recirculating ball steering system according to a prior art example illustrating forces associated with operation thereof.
Figure 3:
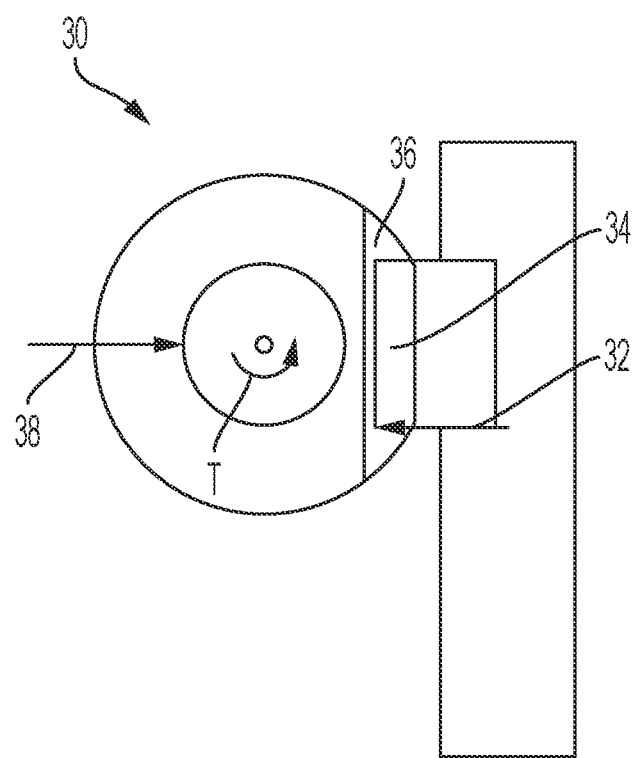
FIG. 3 is a ball screw assembly according to a prior art example illustrating forces associated with operation thereof.
Figure 4:
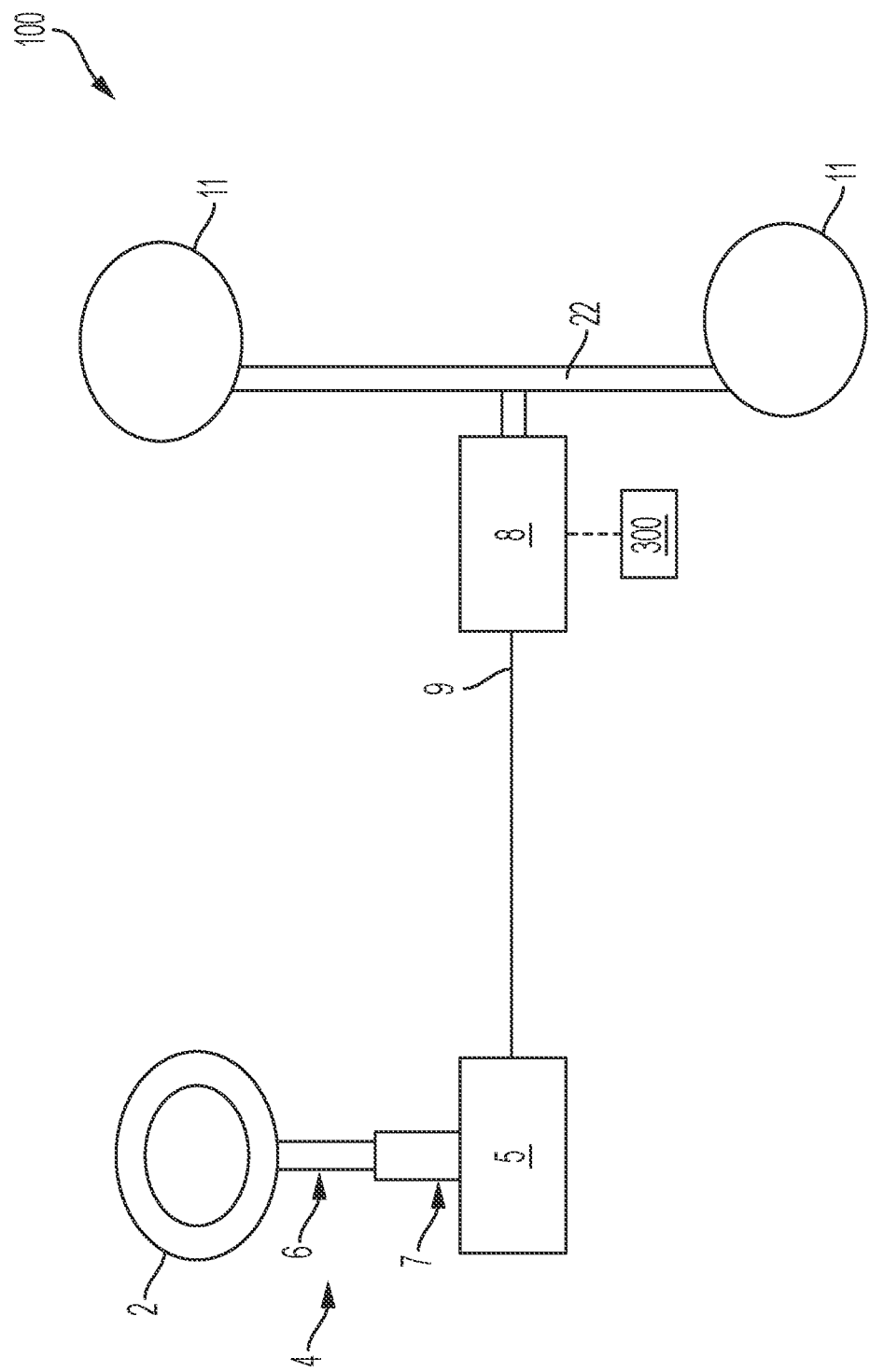
FIG. 4 is a schematic illustration of a power steering system.

Referring to FIG. 4, a power steering system 100 is generally illustrated. The power steering system 100 may be configured as a driver interface steering system, an autonomous driving system, or a system that allows for both driver interface and autonomous steering. The steering system may include an input device 2, such as a steering wheel or other HWAs, wherein a driver may mechanically provide a steering input by turning the steering wheel.

A steering column 4 extends along an axis from the input device 2 to an output assembly 5. The steering column 4 may include at least two axially adjustable parts, for example, a first portion 6 and a second portion 7 that are axially adjustable with respect to one another. The output assembly 5 may include a pinion shaft assembly, an I-shaft, a cardan joint, steer-by-wire components or any other features conventionally located opposite the input device 2. The output assembly 5 may connect to a power-assist assembly 8 (RWA) via a connection 9. The connection 9 may be one of a steering gear input shaft, a continuation of the pinion shaft assembly, or wired or wireless digital communication protocols. The power-assist assembly 8 may be used to drive a rack 22 to adjust road wheels 11 to carry out steering maneuvers. As will be described in greater detail below, behavior of the power-assist assembly 8 may be controlled via a control system 300.

Figure 5:
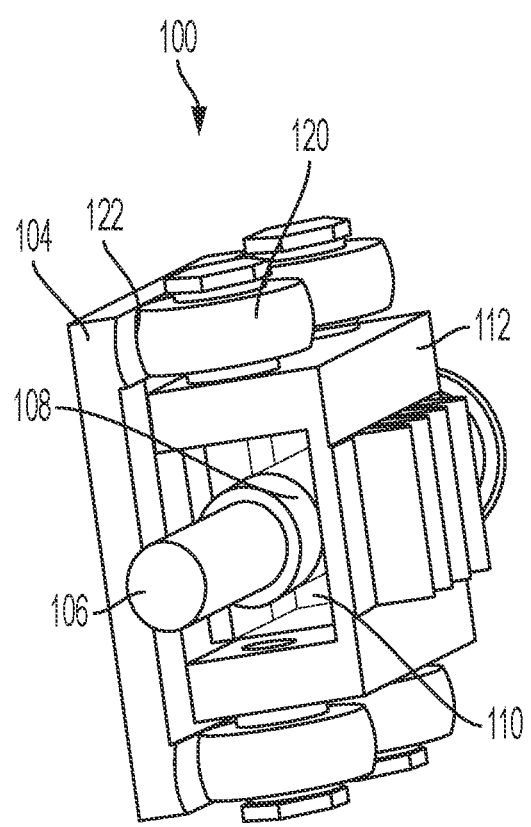
FIG. 5 is a perspective view of an electric powered recirculating ball assembly.

FIG. 5 illustrates a portion of the power steering system 100. In particular, the power-assist assembly 8 and the connection 9 are shown in more detail. The power-assist assembly 8 and the connection 9 are part of a rack electric power steering (REPS) system and may be referred to as such herein.

Illustrated is an interface region between a steering rack 112 and a steering gear housing 104. The assembly is shown schematically to illustrate the workings of a recirculating ball mechanism. The disclosed power-assist assembly 8 relies on the recirculating ball mechanism, which combines torque from the input device 2 (e.g., steering wheel) and an electric motor (not shown), and transfers torque to and from a mechanical structure. An input shaft 106 is operatively connected to the steering wheel 2, such as through the steering column 4 and linkage. The input shaft 106 has a ball screw 108 formed on one end. The ball screw 108 shown is formed as an integral, one-piece member with the input shaft 106, but it is to be appreciated that the ball screw 108 may be operatively coupled to the input shaft 106.

A ball nut 110 circumscribes the ball screw 108 and is in torque-transfer communication with the ball screw 108 through a plurality of ball bearings, which circulate between the ball screw 108 and the ball nut 110. The ball nut 110 slides but does not rotate due to the immediately surrounding structure. Rotation of the steering wheel 2 causes the input shaft 106 and the ball screw 108 to rotate. As the ball screw 108 rotates, rotation is transferred to the ball nut 110 and linear movement of the ball nut 110 is caused. A rack 112 is operatively coupled to the ball nut 110 and is meshed with a sector gear 114 (FIGS. 6-9) for torque transfer therewith.

Figure 6:
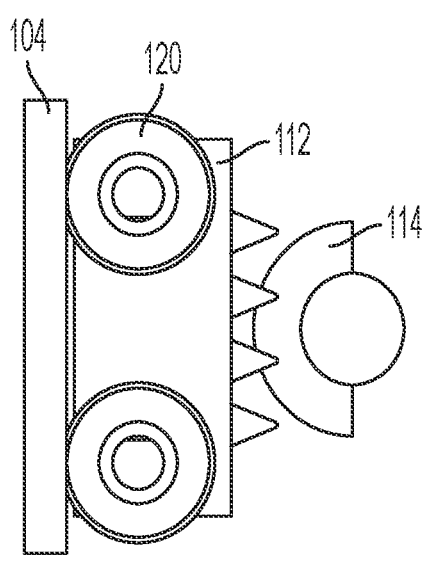
FIG. 6 is a schematic view of the electric powered recirculating ball assembly illustrating forces associated with operation thereof.
Figure 7:
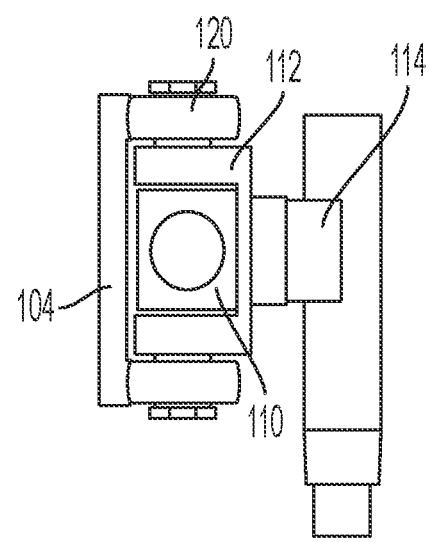
FIG. 7 is a schematic view of the electric powered recirculating ball assembly illustrating additional forces associated with operation thereof.
Figure 8:
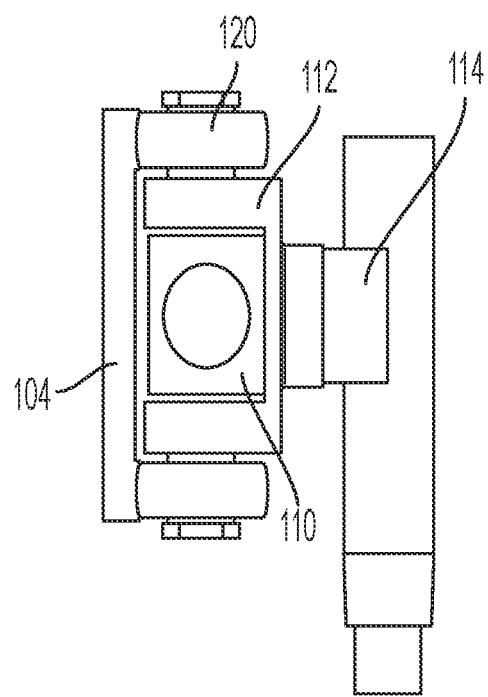
FIG. 8 is a schematic view of the electric powered recirculating ball assembly illustrating additional forces associated with operation thereof.

Referring now to FIGS. 5-8, it would be desirable to direct the load reactions from the above-described force couple and the gear separating force away from the ball circuit (radial loads shown in FIGS. 6 and 7). It is also desirable to improve the load balance in the gear teeth resulting from the assist torque reaction (FIG. 8).

The embodiments described herein address these issues by adding a plurality of rolling elements 120 to the rack 112 and interfacing the rolling elements 120 with steering gear housing features 122 having a mating geometry corresponding to the rolling elements 120. The steering gear housing features 122 are operatively coupled to, or integrally formed with, the steering gear housing 104. The rolling elements 120 may be integrally formed with the rack 112, or separate components that are operatively coupled to the rack 112, as shown. The rolling elements 120 are fixed to the rack 112 and may have motion with respect to the rack 112. This allows for the effect of manufacturing variation to be mitigated. The dimensions (e.g., diameter, width, etc.) of the rolling elements 120 may vary depending upon the particular application of use.

In the illustrated embodiments, the rack 112 is operatively coupled to four rolling elements 120. In particular, a first pair of rolling elements are located on one side of the rack 112 and a second pair of rolling elements are located on an opposite side of the rack 112. It is to be understood that more or fewer rolling elements 120 may be included. The above-described mitigation of manufacturing variation is facilitated by allowing the rack 112 to move between the first pair of rolling elements and the second pair of rolling elements. In some embodiments, the rolling elements 120 are connected to the rack 112 with a pin or the like, with the rack 112 moving along the pin to attain the movement between the pairs of rolling elements.

The rolling elements 120 bear the radial loading and allow for low-friction axial translation of the rack 112. The rolling elements 120 are shown as wheels in the illustrated embodiment. Any suitable coupling may be utilized. The mating geometry of the steering gear housing features 122 reacts the radial loading to the steering gear housing 104.

Figure 9:
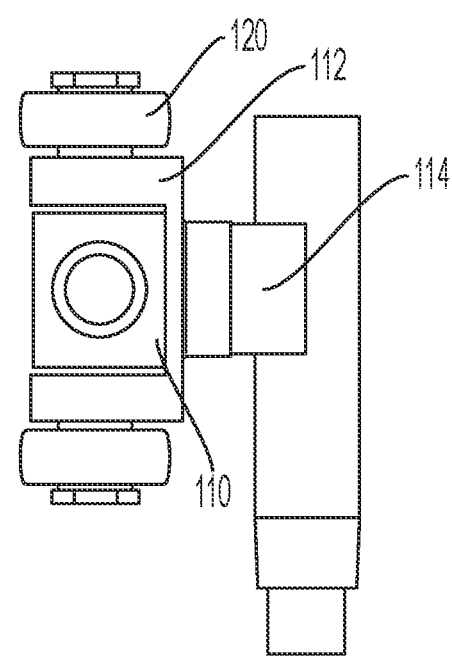
FIG. 9 is a schematic view of the electric powered recirculating ball assembly illustrating a decoupled ball circuit.

Referring now to FIG. 9, in addition to the loading concern in the ball screw 108, dimensional variation from manufacturing must also be considered. This dimensional variation can allow for unintended constraint of the ball circuit and degraded function. To reduce the effect of manufacturing variation, the ball circuit is decoupled to allow unconstrained motion in the directions perpendicular to its axis. In other words, the ball nut 108 is a separate member from the rack 112 and is moveable relative to the rack 112. This allows for the effect of manufacturing variation to be mitigated. The ball nut 110 is allowed to move in the lateral direction with respect to the rack 112 (i.e., toward and away from the sector gear 114), and the rack 112 is allowed to move in the vertical direction with respect to the output shaft (i.e.

The relative motion of the ball nut 110 and the rack 112 in the directions perpendicular to the ball screw axis allow for the ball circuit to have only the thrust force present along its axis. This allows for a smaller ball circuit. A smaller ball circuit allows for reduced sensitivity to manufacturing tolerances.

The embodiments disclosed herein include structural features for directing the load reactions that are perpendicular to the ball screw axis directly to the steering gear housing. This is accomplished through a combination of rolling elements. The rolling elements provide a loading balance that reduces the load reaction in the gear teeth resulting from the assist torque.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An electric powered recirculating ball assembly comprising:
   a steering rack;
   a steering gear housing; and
   a plurality of rolling elements operatively coupled to the steering rack and in contact with mating geometry of a component operatively coupled to, or integrally formed with, the steering gear housing, wherein the plurality of rolling elements are operatively coupled to the steering rack with a pin extending through the steering rack.

2. The electric power recirculating ball assembly of claim 1, wherein at least one of the rolling elements is disposed on a first side of the steering rack and at least one of the rolling elements is disposed on a second side of the steering rack.

3. The electric power recirculating ball assembly of claim 2, wherein the steering rack is slideable along the pin between the rolling element(s) on the first side of the steering rack and the rolling element(s) on the second side of the steering rack.

4. The electric power recirculating ball assembly of claim 1, wherein the plurality of rolling elements are wheels or bearings.

5. The electric power recirculating ball assembly of claim 1, further comprising a ball nut located adjacent the steering rack, wherein the ball nut is moveable relative to the steering rack.

6. The electric power recirculating ball assembly of claim 5, further comprising a sector gear in meshed engagement with the steering rack, wherein the ball nut is moveable toward and away from the sector gear.

7. An electric powered recirculating ball assembly comprising:
   a steering rack;
   a plurality of rolling elements operatively coupled to the steering rack; and
   a ball nut located adjacent the steering rack, wherein the ball nut is moveable relative to the steering rack, wherein the plurality of rolling elements are operatively coupled to the steering rack with a pin extending through the steering rack.

8. The electric power recirculating ball assembly of claim 7, further comprising a sector gear in meshed engagement with the steering rack, wherein the ball nut is moveable toward and away from the sector gear.

9. The electric power recirculating ball assembly of claim 7, further comprising a steering gear housing, wherein the plurality of rolling elements are in contact with mating geometry of a component operatively coupled to, or integrally formed with, the steering gear housing.

10. The electric power recirculating ball assembly of claim 7, wherein at least one of the rolling elements is disposed on a first side of the steering rack and at least one of the rolling elements is disposed on a second side of the steering rack.

11. The electric power recirculating ball assembly of claim 7, wherein the steering rack is slideable along the pin between the rolling element(s) on the first side of the steering rack and the rolling element(s) on the second side of the steering rack.

12. An electric powered recirculating ball assembly comprising:
   a steering rack;
   a plurality of rolling elements operatively coupled to the steering rack; and
   a ball nut located adjacent the steering rack, wherein the ball nut is moveable relative to the steering rack, wherein the plurality of rolling elements are wheels.

13. The electric power recirculating ball assembly of claim 12, further comprising a sector gear in meshed engagement with the steering rack, wherein the ball nut is moveable toward and away from the sector gear.

14. The electric power recirculating ball assembly of claim 12, further comprising a steering gear housing, wherein the plurality of rolling elements are in contact with mating geometry of a component operatively coupled to, or integrally formed with, the steering gear housing.

* * * * *